June 22, 1926.

M. H. WERLEY 1,590,006

IDENTIFICATION CARD RECEPTACLE ATTACHMENT FOR AUTOMOBILES

Filed Jan. 13, 1925

M. H. Werley,
Inventor

By Clarence A. O'Brien
Attorney

June 22, 1926.

M. H. WERLEY 1,590,006

IDENTIFICATION CARD RECEPTACLE ATTACHMENT FOR AUTOMOBILES

Filed Jan. 13, 1925  2 Sheets-Sheet 2

M. H. Werley,
Inventor

By Clarence O'Brien
Attorney

Patented June 22, 1926.

1,590,006

UNITED STATES PATENT OFFICE.

MARVIN H. WERLEY, OF ALLENTOWN, PENNSYLVANIA.

IDENTIFICATION-CARD-RECEPTACLE ATTACHMENT FOR AUTOMOBILES.

Application filed January 13, 1925. Serial No. 2,103.

This invention relates to a receptacle for holding identification means such as the driver's license, registration card and other necessary papers, the receptacle being supported on the instrument board of an automobile.

One of the important objects of the present invention is to provide means for unlocking and locking the receptacle simultaneously with the actuation of the usual ignition switch of the automobile.

A further object is to provide a device of the above mentioned character, whereby the receptacle remains unlocked when the ignition switch is turned on and the automobile is occupied, the receptacle being adapted to be locked when the switch key has been removed from the ignition switch so as to prevent any unauthorized person from gaining access to the receptacle when the operator of the automobile leaves the same.

A further object of the invention is to provide a device of the above mentioned character, which is of such construction as to enable the same to be readily and easily installed on the instrument board of an automobile, the device being further simple in construction, inexpensive, strong and durable and further well adapted for the purposes for which it is designated.

Other objects and advantages will become apparent during the course of the following description.

In the accompanying drawings forming a part of this specification, and in which like numerals designate like parts throughout the same:

Figure 7 is a detail perspective view of the receptacle.

Figure 1:
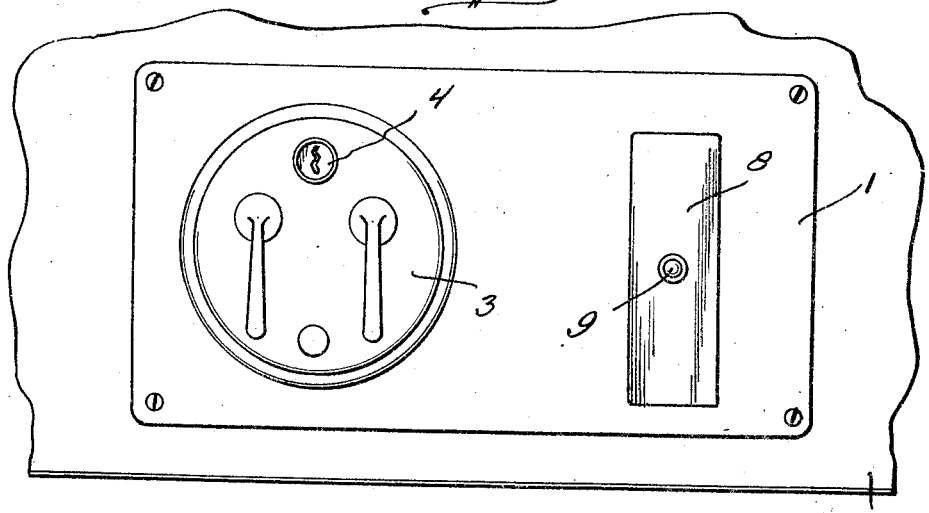
Figure 1 is a front elevation of a portion of an instrument board of an automobile showing my invention mounted thereon.
Figure 2:
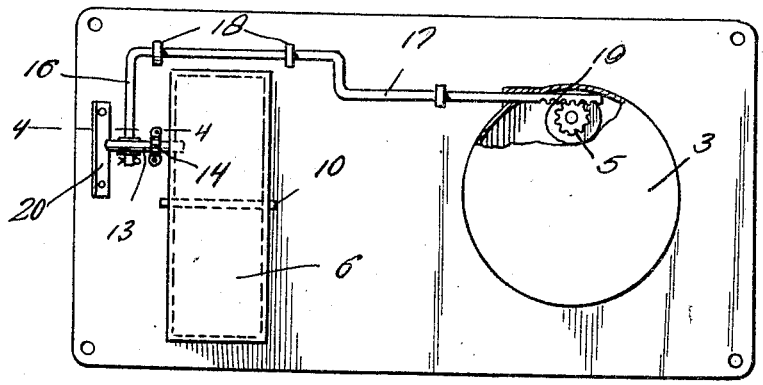
Figure 2 is a rear elevation thereof.
Figure 3:
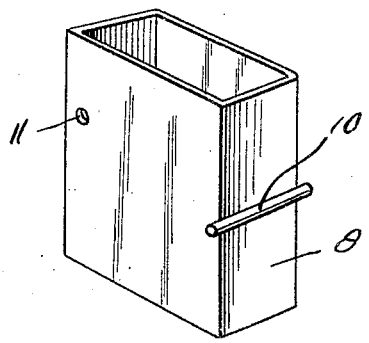
Figure 3 is a top plan view.
Figure 3:
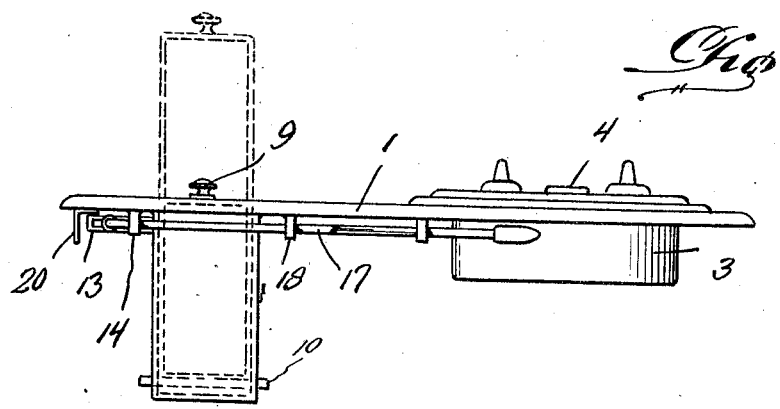

In the drawings, wherein for the purpose of illustration is shown the preferred embodiment of my invention, the numeral 1 designates a mounting plate which is secured on the instrument board 2 of an automobile in any well known manner. The ignition switch of the automobile is supported on the plate 1 and is indicated generally at 3. The usual cylindrical lock associated with the ignition switch is designated by the numeral 4. A pinion 5 is associated with the rear end of the rotatable element of the lock 4 and this detail is more clearly illustrated in Figure 2 of the drawings, the purpose thereof will hereinafter be more fully described.

Figure 6:
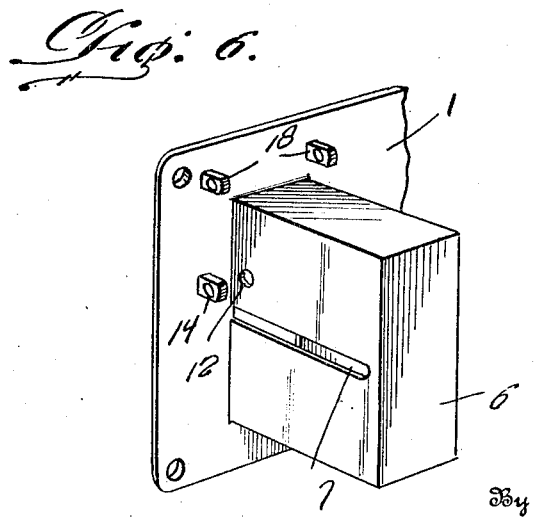
Figure 6 is a fragmentary detail perspective view of the casing for the receptacle mounted on the rear portion of the plate.

A substantially rectangular casing 6 is associated with the plate 1 on the rear side thereof, the front of the casing being open cooperating with a similar opening formed in the plate. A pair of aligning slots such as is shown at 7 is formed in the side of the casing and the same extend from the forward ends of the casing to a point adjacent the rear end thereof, as clearly illustrated in Figure 6.

Figure 4:
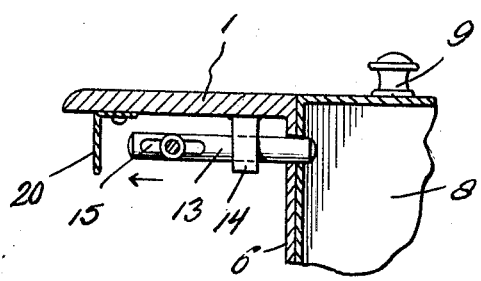
Figure 4 is a sectional view taken approximately on line 4—4 of Figure 2.
Figure 5:
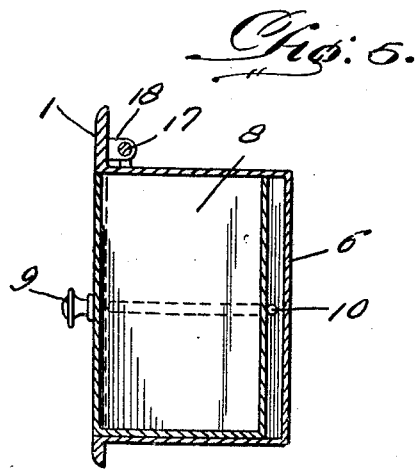
Figure 5 is a vertical sectional view through the casing and the receptacle mounted therein.

Adapted for slidable movement within the casing 6 is the receptacle or drawer 8. The top thereof is open as clearly illustrated in Figure 7. A handle 9 is associated with the forward end thereof whereby the receptacle may be moved inwardly of the casing in order to gain access thereto. Normally the forward end of the receptacle or drawer 8 is disposed flush with the front face of the plate 1 as clearly illustrated in Figures 4 and 5. A pin 10 is supported on the rear end of the receptacle 8 and the ends thereof extend beyond the respective sides of the receptacle. The outwardly extending ends of the pin are adapted to operate in the slot 7 formed in the respective sides of the casing 6, and the purpose thereof is to provide a means for limiting the forward and rearward movement of the receptacle. An opening such as is illustrated at 11 is provided in one of the sides of the receptacle adjacent the forward end thereof, the same being adapted to register with a similar opening 12 formed in the adjacent side of the casing 6. The purpose of these openings will hereinafter be more fully described.

A sliding bolt 13 is arranged on the rear face of the plate 1 and is operable through the guide 14. The inner end of the bolt is adapted to be disposed through the registering openings 11 and 12 provided in the receptacle and casing respectively, whereby the receptacle is held in a locked position within the casing against removal therefrom. The outer end of the bolt is provided with a longitudinally extending slot 15 and operable therein is the lower ends of the downwardly extending portion 16 of a horizontally extending actuating rod 17. The latter is adapted for slidable movement within suitable guides 18 provided therefor on the rear face of the plate 1 as more clearly illustrated in Figure 2. The inner end of the rod 17 extends into the casing for the ignition switch 3 and is provided with the rack teeth 19 for engagement with the pinion 5.

Normally when the automobile is not in operation, and the switch key is removed from the ignition switch, the receptacle 8 will be held in a locked position within the casing 6 through the medium of the locking bolt 13 having its inner end disposed through the registering opening provided in the casing and receptacle. This will prevent any unauthorized person from gaining access to the receptacle and removing the valuable papers contained therein such as the operator's driving permit, registration card and other identification means.

When the proper key is inserted in the cylindrical lock 4 of the ignition switch for turning the latter on, simultaneous with the rotation of the cylinder lock 4 the rod 17 will be caused to move outwardly through the medium of the pinion 5 and the rack teeth 19. The outward movement of the rod 17 results in the outward movement of the bolt 13 causing the inner end thereof to be moved out of engagement with the registering opening provided in the casing and receptacle whereby the receptacle is unlocked and enabling the same to be readily withdrawn from the casing whenever it becomes necessary to again access to the various papers contained therein. The receptacle will remain open as long as the key is not turned in the cylinder lock 4 of the ignition switch 3. When the ignition switch is to be locked, the rotation of the rotatable element of the cylinder lock will cause a reverse movement of a rod 17, consequently causing the inward sliding movement of the bolt 13 whereby the inner end thereof will be brought into locked engagement with the registering openings provided in the casing and receptacle, thereby locking the receptacle within the casing and preventing the same from being open. The key is of course removed from the lock, thereby securely locking the receptacle against opening or withdrawal of the casing by any unauthorized persons.

For the purpose of limiting the outward sliding movement of the bolt 13 when the ignition switch is turned on and the receptacle is simultaneously unlocked, I provide the angular stop plate 20, the same being secured on the rear face of the plate 1 as clearly illustrated in the drawings.

It will thus be seen from the foregoing description, that a device has been provided which will at all times be positive and efficient in its operation, the locking and unlocking of the receptacle being controlled by the actuation of the operation of the ignition switch of the automobile.

The simplicity in which my device is constructed enables the several parts comprising the same to be readily and easily installed on the instrument board of an automobile without materially altering the same.

While I have shown the preferred embodiment of my invention it is to be understood that various changes in the size, shape and arrangement of parts may be resorted to, without departing from the spirit of the invention and the scope of the appended claims.

Having thus described the invention, what I claim is:—

1. In combination with the ignition switch of an automobile, and the usual locking means associated with said switch, of a casing supported on the rear face of the instrument board of the automobile, a receptacle adapted for slidable movement in said casing, and through said instrument board, said casing and said receptacle being provided with registering openings, a slidable bolt supported on the rear face of the instrument board, the inner end thereof being adapted to be disposed in said registering opening for locking the receptacle in the casing, means associated with the outer end of the bolt and said ignition switch locking means for actuating said bolt simultaneous with the operation of said ignition switch locking means, said means comprising an elongated rod adapted for slidable movement on the rear face of the instrument board, the outer end thereof being operatively associated with the outer end of the sliding bolt, the inner end of the rod being operatively associated with the rotatable element of the usual cylindrical lock of the ignition switch locking means, and means for limiting the outward sliding movement of said bolt.

2. In combination with the ignition switch of an automobile, and the usual locking means associated with said switch, of a casing supported on the rear face of the instrument board of the automobile, a receptacle adapted for slidable movement in said casing, and through said instrument board, said casing and said receptacle being provided with registering openings, a slidable bolt supported on the rear face of the instrument board, the inner end thereof being adapted to be disposed in said registering opening for locking the receptacle in the casing, means associated with the outer end of the bolt and said ignition switch locking means for actuating said bolt simultaneous with the operation of said ignition switch locking means, said means comprising an elongated rod adapted for slidable movement on the rear face of the instrument board, the outer end thereof being operatively associated with the outer end of the sliding bolt, the inner end of the rod being operatively associated with the rotatable element of the usual cylindrical lock of the ignition switch locking means, means for limiting the outward sliding movement of said bolt, and additional means for limiting the sliding movement of said receptacle with respect to said casing.

3. In combination with the ignition switch of an automobile, and the usual locking means associated with said switch, of a casing supported on the rear face of the instrument board of the automobile, a receptacle adapted for slidable movement in said casing, and through the instrument board, said casing and said receptacle being provided with registering openings, a slidable bolt supported on the rear face of the instrument board, the inner end thereof being adapted to be disposed in said registering openings for locking the receptacle in the casing, an elongated rod adapted for slidable movement on the rear face of the instrument board, the outer end thereof being operatively associated with the outer end of the slidable bolt, the inner end of the rod being operatively associated with the rotatable element of the usual cylindrical lock of the ignition switch whereby the sliding bolt is operated simultaneous with the operation of the ignition switch locking means for locking and unlocking the receptacle with respect to the casing, the opposed sides of the casing being provided with elongated slots, a pin supported transversely on the rear end of the receptacle and the ends thereof extending beyond the respective sides of the receptacle, the ends of the pin being disposed within the respective longitudinal slots and cooperating therewith for limiting the sliding movement of the receptacle with respect to the casing.

In testimony whereof I affix my signature.

MARVIN H. WERLEY.